United States Patent [19]

Nolan

[11] Patent Number: 4,519,569
[45] Date of Patent: May 28, 1985

[54] MOLDING

[75] Inventor: Robert L. Nolan, New York, N.Y.

[73] Assignee: Maxcap, Inc., New York, N.Y.

[21] Appl. No.: 597,189

[22] Filed: Apr. 5, 1984

[51] Int. Cl.³ .............................................. B29F 1/14
[52] U.S. Cl. ..................... 249/142; 249/59;
249/63; 249/66 R; 249/161; 425/438; 425/443;
425/577; 425/DIG. 58
[58] Field of Search .................. 249/59, 63, 66 R, 67,
249/68, 142, 160, 161; 425/436 R, 438, 441,
443, 542, 556, 577, DIG. 58

[56] References Cited

U.S. PATENT DOCUMENTS

| 3,020,594 | 2/1962 | Mokowski | 249/59 X |
|---|---|---|---|
| 3,064,310 | 11/1962 | Cooprider | 425/577 X |
| 3,125,801 | 3/1964 | Fields | 249/68 X |
| 3,208,649 | 9/1965 | Fields | 249/59 X |
| 3,247,548 | 4/1966 | Fields et al. | 425/438 |
| 3,344,942 | 10/1967 | Hedgewick | 425/556 X |
| 3,373,479 | 3/1968 | Watt et al. | 425/441 X |
| 3,461,488 | 8/1969 | Croyle | 425/577 |
| 3,537,676 | 11/1970 | Miller | 249/59 |
| 3,555,606 | 1/1971 | Hedgewick | 425/556 |
| 3,660,001 | 5/1972 | Roehr | 425/438 X |
| 3,737,277 | 6/1973 | Uhlig | 425/438 |
| 3,843,088 | 10/1974 | McLoughlin | 425/DIG. 58 |
| 3,904,165 | 9/1975 | Den Boer | 249/67 |
| 3,905,740 | 9/1975 | Lovejoy | 425/438 |
| 3,940,103 | 2/1976 | Hilaire | 249/59 X |
| 4,019,711 | 4/1977 | Altenhof et al. | 425/DIG. 58 |
| 4,155,698 | 5/1979 | Aichinger | 425/556 |
| 4,238,106 | 12/1980 | Willingham | 249/63 X |

FOREIGN PATENT DOCUMENTS 1270357 7/1961 France ................................. 249/59

Primary Examiner—J. Howard Flint, Jr.
Attorney, Agent, or Firm—Abner Sheffer

[57] ABSTRACT

For the molding of bottle caps having irregular lower boundaries, such as caps having depending tabs, the conventional mold has a core and a surrounding sleeve in which the core slides. This is modified by using a split sleeve which is maintained in close contact with the core during molding, but whose elements are freed to move outwardly away from the core when the mold begins to open. This solves the prior art problem of the galling of the contacting surfaces of sleeve and core.

10 Claims, 7 Drawing Figures

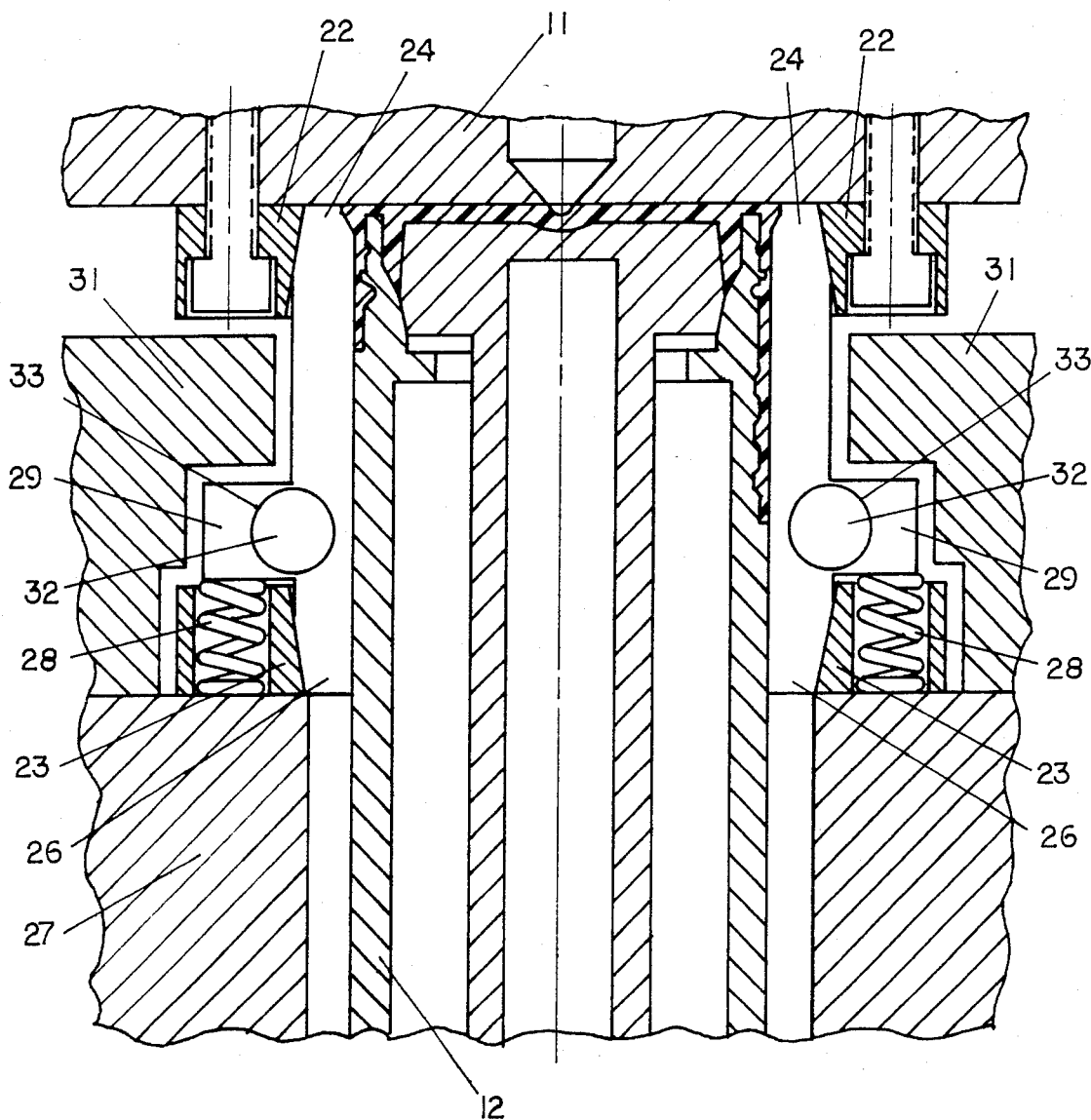
FIG. 4
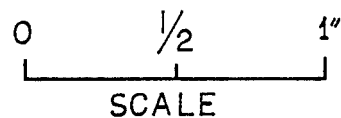
SCALE

MOLDING

This invention relates to the molding of plastic bottle caps, particularly plastic bottle caps having depending tabs, such as those shown in U.S. Pat. No. 4,166,552.

The prior art and the invention are described below by reference to the drawings, in which FIG. 1 is a cross-sectional view of the mold used in the prior art, with the mold in the closed (molding) position;

Figure 5:
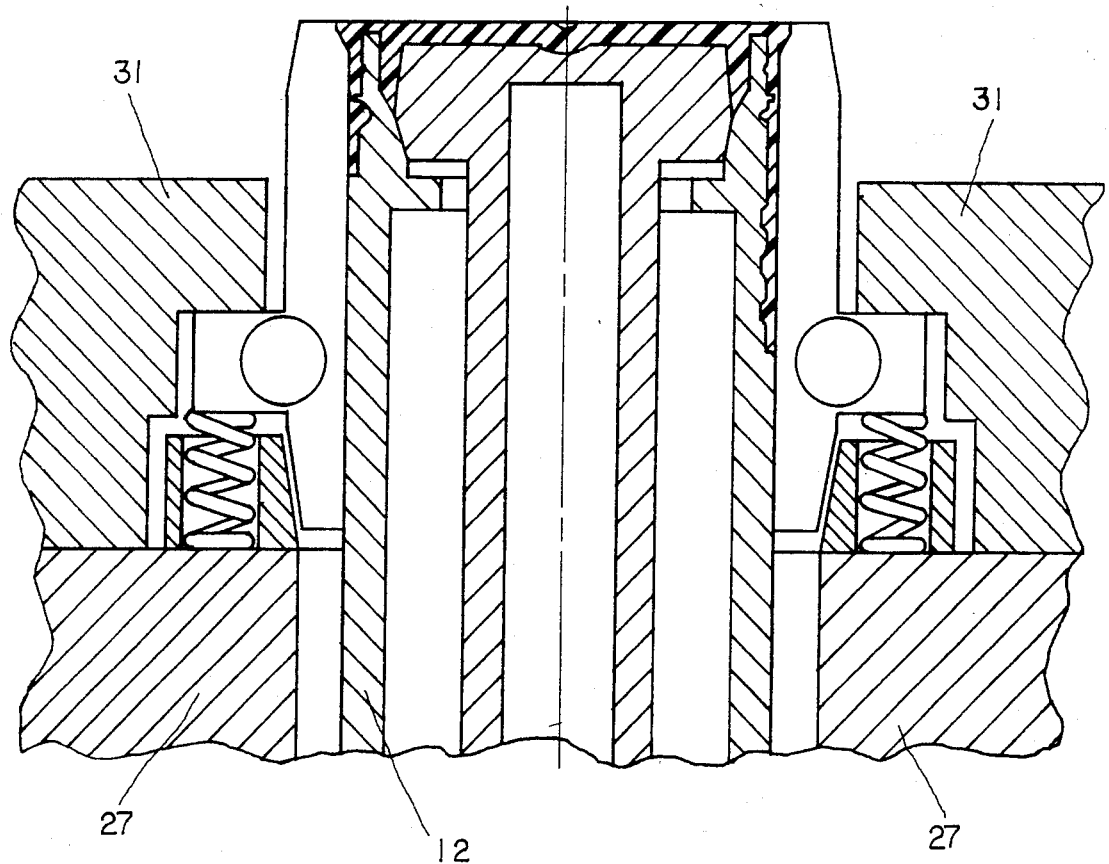
Figure 6:
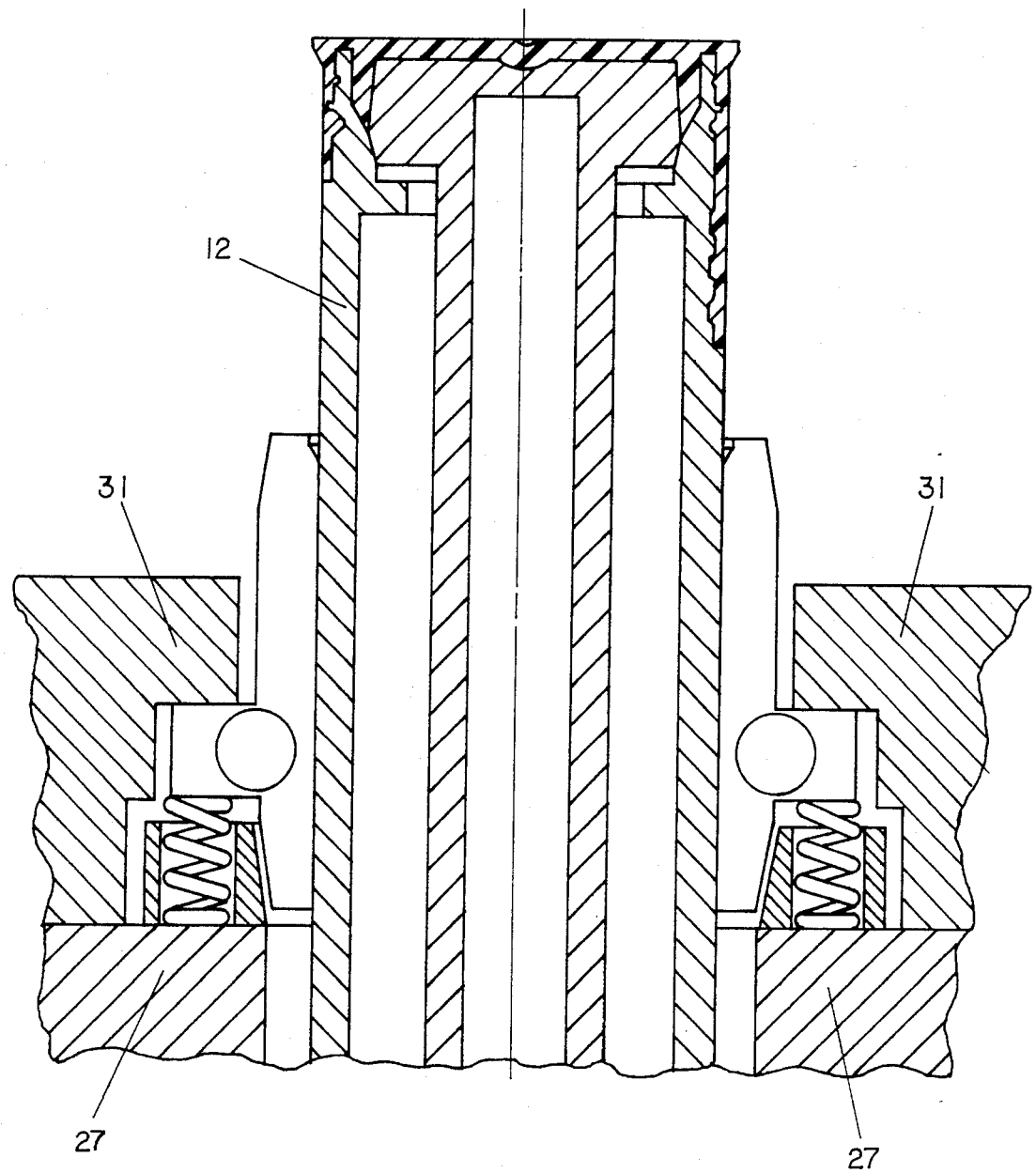
Figure 7:
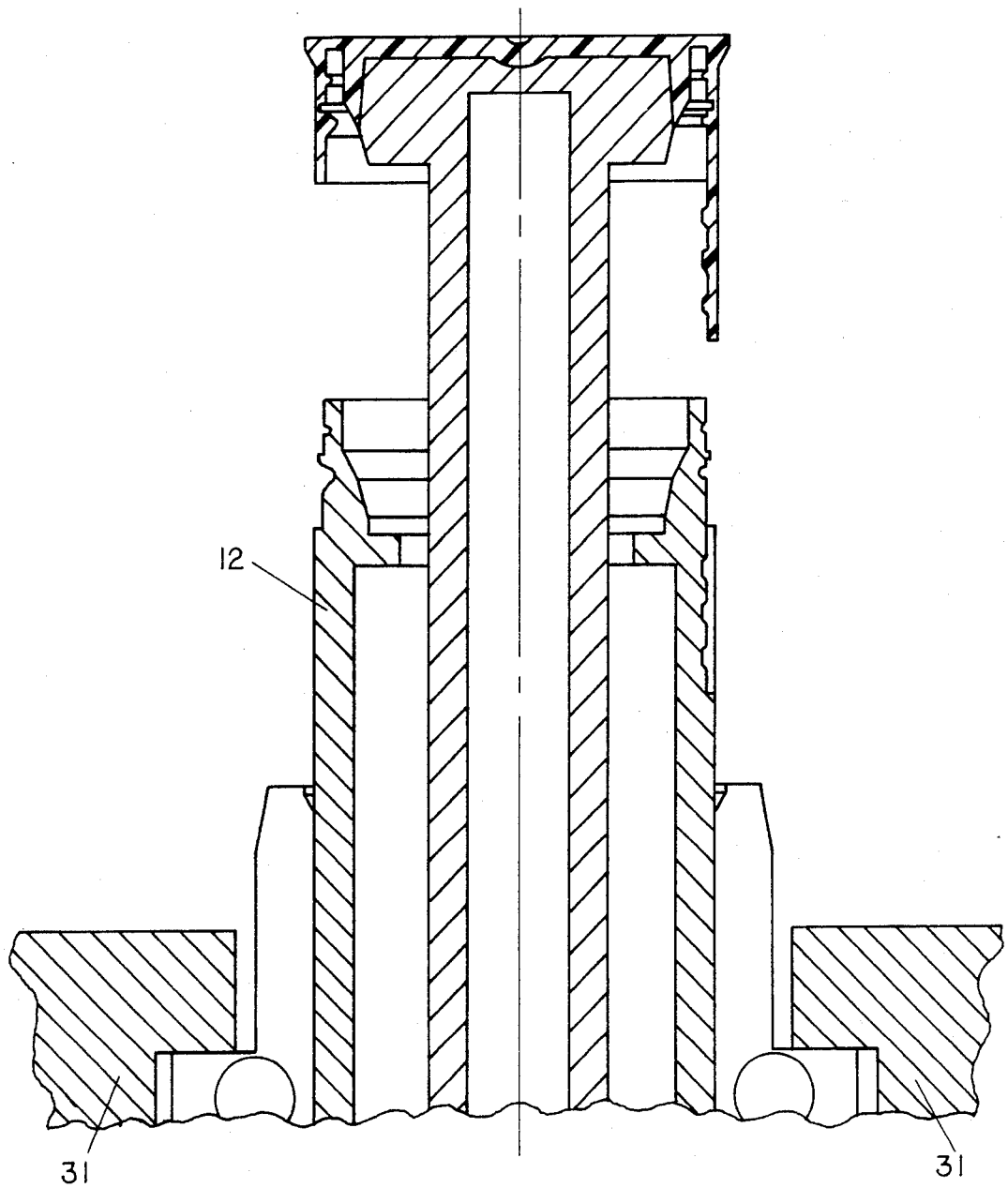

FIGS. 4, 5, 6, and 7 are views in cross section of the mold, and the cap being formed therein, at successive stages.

Figure 1:
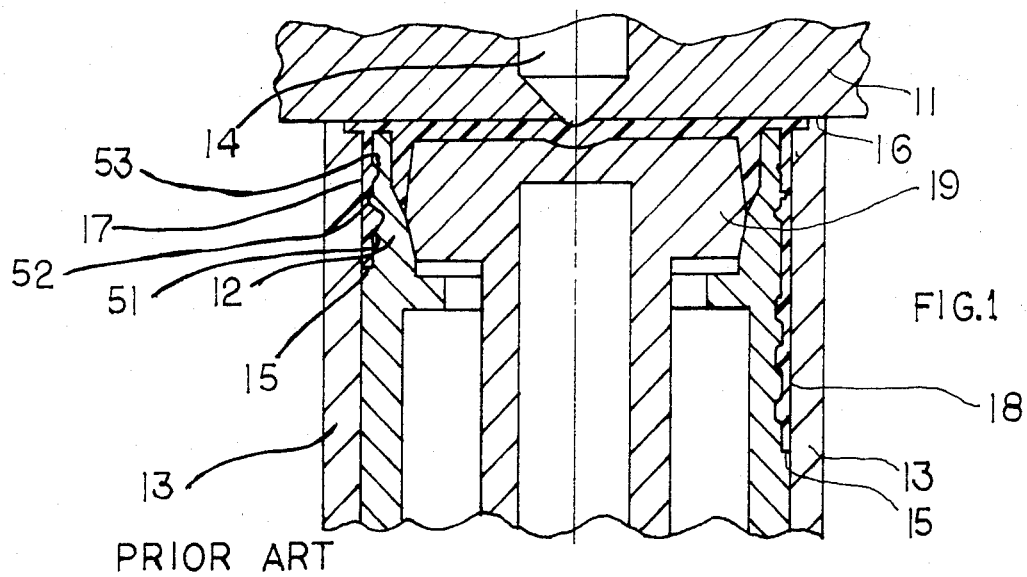
Figure 2:
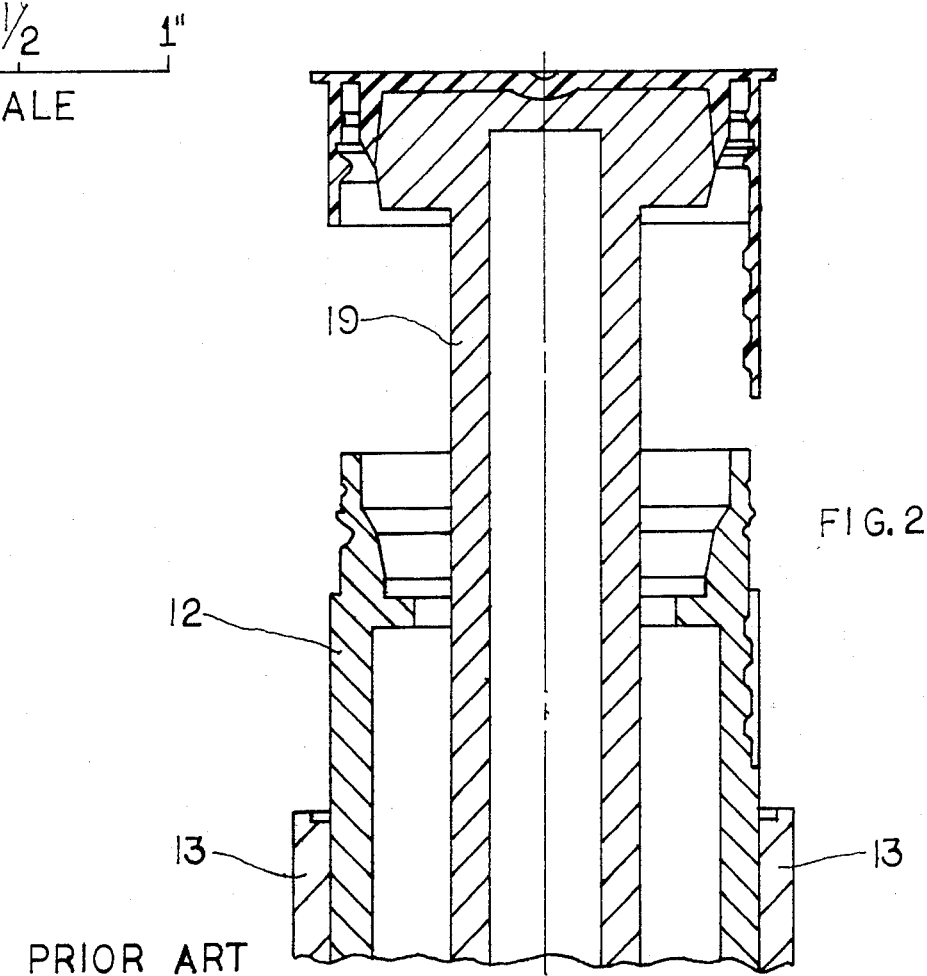
FIG. 2 is a view like FIG. 1, but with the mold in open position.
Figure 3:
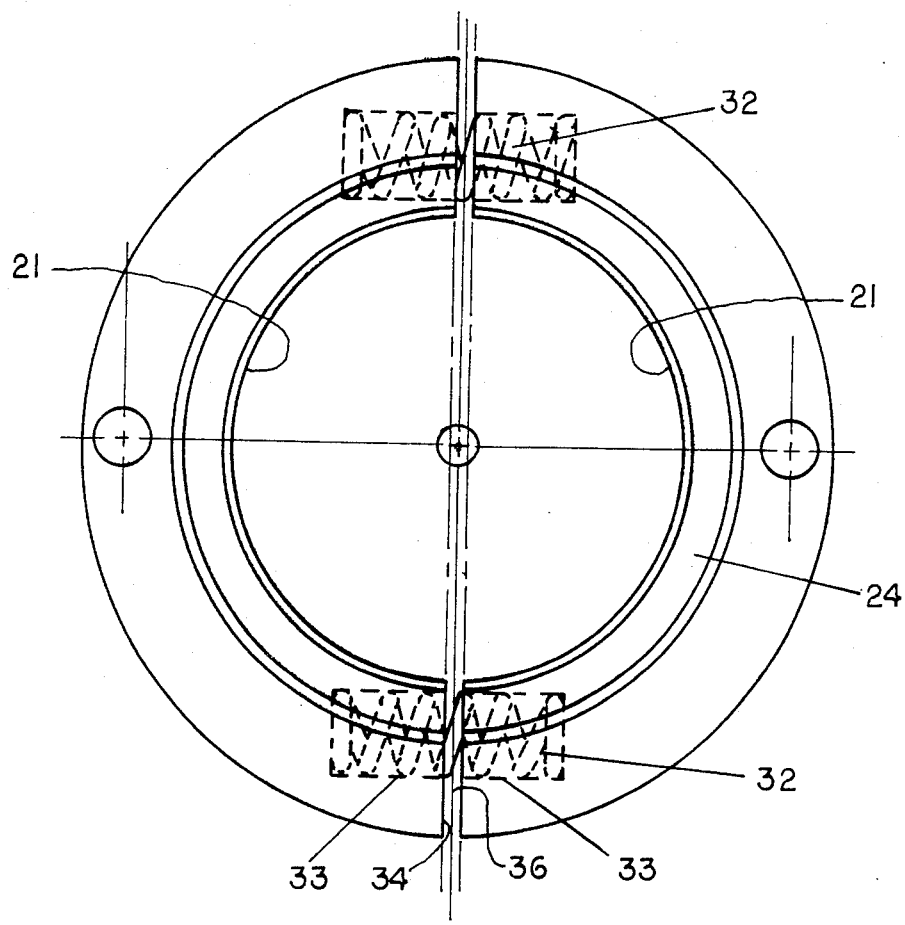
FIG. 3 is an end view of a split sleeve, with the sleeve halves separated somewhat.

FIGS. 1 to 7 are drawn to the scales shown thereon.

Plastic bottle caps having irregular lower boundaries (such as caps having substantially straight side walls with depending tabs) are conventionally molded in a mold (Fig. 1) having a cavity defined by an end member or plate 11, a core 12 and a sleeve 13. The hot molten plastic is injected, typically, through a gate 14 leading through the end member 11; it cools quickly to a solid self-supporting state in contact with these cooled mold elements.

The sleeve 13 typically has a smooth circular cylindrical interior and fits tightly around the core at the lower boundary 15 of the mold space so as to prevent leakage of hot plastic around that boundary during molding. Typically, the permissible clearance between core and sleeve at that boundary is about 0.00005 inch or less. The upper end 16 of the sleeve preferably also fits closely against the end plate 11 to prevent leakage there.

It will be understood that the outer surfaces of the side wall 17 of the cap and of its depending tab 18 are formed by contact of the hot plastic with the inner walls of the sleeve above the boundary 15. The outer surface of the hot plastic of the top of the cap is formed by contact with the end plate 11, and the inner surfaces of the cap are formed by contact with the core 12.

On completion of the molding of the cap the mold is opened, i.e., the core and sleeve are moved relatively away from the end member (see FIG. 2) and the formed solid cap is pushed off core 12 by an ejector pin 19 carried in the core. Since there are undercuts, etc. in the core the cap must expand somewhat when it is being stripped from the core. Such expansion is permitted because the core then moves, relatively, with respect to the sleeve (whose movement is suitably restrained as by springs, not shown), e.g. the core slides within the sleeve so as to bring the molded cap away from the sleeve.

It is found that with continued use of the molds of the prior art the slidingly contacting surfaces of the core and sleeve become galled making it necessary to replace the sleeve and/or core frequently.

My improved molding method solves the galling problem. It uses a longitudinally split sleeve (FIG. 3), whose inner surfaces 21 are maintained in the necessary close contact with the core when the mold is in closed position and are freed to move outwardly away from the core when the mold begins to open. More particularly, the split sleeve is held in close contact with the core by engagement with cam elements. These cam elements (see FIG. 4) may include, for instance, two cam rings 22, 23 for engaging the opposite ends 24, 26 of the split sleeve. The first cam ring 22 (engaging the first end 24 of the split sleeve) may be fixed to the end plate 11 of the mold and the second cam ring 23 (engaging the second end 26 of the split sleeve) may be fixed for instance to a plate 27 in which the core 12 is movably mounted. The split sleeve may be biased in a direction to release it from the second cam ring 23. For this purpose there may be springs 28 compressed between the second cam ring and a shoulder 29 of the split ring. When the mold is in closed position the engagement of the first end 24 of the split sleeve with the end plate 11 and/or the first cam ring 22 keeps the second end 26 of the split sleeve positively in cam contact with the second cam ring 23. When the mold begins to open and the core 12 is moved, relatively, away from the end plate (see FIG. 5) the split ring is released from these constraints. The bias (of the springs 28) may not at that stage be sufficient to overcome the friction between the split sleeve and the core and the sleeve may thus remain in restrained cam contact with the second cam ring 23. When the core first starts its sliding movement within the sleeve (to bring the molded cap out of the sleeve) this friction moves the sleeve slightly in the direction of the spring bias, freeing the halves of the split sleeve for outward movement within the limits permitted by a constraining housing 31 (which may a thick plate suitably bored to receive the sleeve). Preferably the degree of expansion is not too great, e.g. the split ring halves are still close enough together that their cam surfaces at end 24 will be engaged by the cam surfaces of the first cam ring 22 when the mold closes. In one embodiment the expansion is about 0.02 inch radially on both sides (i.e. total expansion about 0.04 inch). To help this expansion there are preferably biasing elements, such as helical springs 32 (see FIG. 3) which may be located in aligned pockets 33 bored into the opposing faces of the ring halves. It will be understood that for some purposes the construction may provide for a considerably greater expansion of the split ring.

The mating faces 34, 36 of the halves of the split ring fit closely together (e.g. they are suitably ground) to prevent leakage of plastic between those faces.

In the illustrated embodiment the top wall of the cap has a depending interior plug 38 for engaging within (and sealing) the mouth of the bottle on which the cap is placed. It will be understood that the same molding method may be used for molding caps whose top walls do not have such a plug and which may have other mouth-sealing elements. For instance, the cap may be of the known type which uses a separate gasket, such a disk of gasket material positioned inside the cap just underneath the top wall.

As illustrated, the caps are of the tamper-indicating snap-on type having an internal bead 51 (FIG. 1) adapted to be snapped over a shoulder on the bottle neck (not shown), a line of weakness 52 enabling the lower tamper-indicating portion of the cap to be torn off by the use of the tab 18, and an upper bead 53 adapted to be snapped over an upper shoulder on the bottle neck (so that the cap can be retained firmly on the bottle after the removal of the lower portion).

The drawings illustrate two forms of lips at the top of the bottle, straight (in FIG. 1) and angled (in FIG. 4). It will be understood that different forms of lip, or no lip at all, may be used.

The caps are typically injection molded from conventional thermoplastic materials. such as polyolefines, e.g. low density polyethylene.

The invention is particularly suitable for the molding of bottle caps (and similar articles) having irregular lower boundaries. For caps having regular lower boundaries (i.e. boundaries which are entirely within a plane at right angles to the axis of the cap) other mold arrangements are generally more economical.

It is understood that the foregoing detailed description is given merely by way of illustration and that variations may be made therein without departing from the spirit of the invention.

I claim:

1. A mold for forming a plastic cap having a top and side wall comprising a core against which the inside of said cap is formed, mold means against which the outside of the top of said cap is formed and a sleeve surrounding said core and against which the outside of the side wall of the cap is formed said sleeve being in close contact with said core at the boundary of the zone where the bottom of said cap side wall is formed, said contact being sufficiently close to substantially prevent flow of plastic between said core and said sleeve at said boundary, said mold having means for effecting axial movement of said core relative to said sleeve on completion of the molding of a cap so as to remove the resulting molded cap from within said sleeve, the improvement wherein said sleeve comprises at least two separable portions each in close contact with said core along said boundary, means for maintaining said portions in said close contact with each other during the molding of said cap, the construction and arrangement being such that said portions are permitted to move away from each other and from said core at the beginning of said axial movement of said core.

2. A mold as in claim 1 for a cap having a depending tab, said sleeve being in said close contact with said core at the boundary of the zone where the bottom of said cap side wall and the edges of said tab are formed.

3. A mold as in claim 2 in which said means for maintaining said sleeve portions in said close contact with said core includes cam means for engaging said sleeve portions during molding of said cap.

4. A mold as in claim 3 in which said top-forming mold means moves relatively away from said sleeve on said completion of molding and said cam means includes a cam which engages said sleeve during the molding and moves away from said sleeve with said top-forming mold means.

5. A mold as in claim 4 in which an end of said sleeve is in close contact with said top-forming mold means along a second boundary to substantially prevent flow of plastic between said top-forming mold means and said sleeve at said second boundary.

6. A mold as in claim 2 wherein the clearance at said boundary between said core and said sleeve is less than 0.00005 inch.

7. A mold as in claim 6 in which the initial axial movement of said core moves said sleeve to free it from said contact-maintaining means.

8. A mold as in claim 1 comprising means for biasing said sleeve portions away from each other.

9. A mold as in claim 2 comprising an end wall against which the outside of the top of said cap is formed, a cam ring carried by said end wall for engaging one end of each of said sleeve portions to maintain said sleeve portions in close contact with said core when said mold is closed, a second cam ring for engaging the other ends of each of said sleeve portions in close contact with said core and spring means urging said sleeve portions axially away from said second cam ring.

10. A mold as in claim 9 comprising spring mean for urging said sleeve portions apart when said ends are freed from said cam rings.

* * * * *